(12) United States Patent
Ito

(10) Patent No.: US 7,154,756 B2
(45) Date of Patent: Dec. 26, 2006

(54) RECORDING MEDIUM MOUNTING APPARATUS

(75) Inventor: Kiyoyuki Ito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 29 days.

(21) Appl. No.: 11/058,779

(22) Filed: Feb. 15, 2005

(65) Prior Publication Data

US 2005/0185375 A1 Aug. 25, 2005

(30) Foreign Application Priority Data

Feb. 19, 2004 (JP) ............................. 2004-042685
Feb. 19, 2004 (JP) ............................. 2004-042691
Feb. 19, 2004 (JP) ............................. 2004-042696

(51) Int. Cl.
 *G06F 1/16* (2006.01)
 *G11B 17/03* (2006.01)

(52) U.S. Cl. .................. 361/724; 312/223.2; 710/101; 720/633

(58) Field of Classification Search ........ 361/679–687, 361/724–727; 312/223.1–223.6; 165/80.3, 165/121–126; 710/2, 62, 101; 720/633, 720/638; 369/30.36, 75.21
See application file for complete search history.

(56) References Cited

U.S. PATENT DOCUMENTS 5,594,619 A * 1/1997 Miyagawa et al. ......... 361/681

2004/0223421 A1 * 11/2004 Matsumura et al. ..... 369/30.36
2005/0226606 A1 * 10/2005 Kikuchi ...................... 386/125

FOREIGN PATENT DOCUMENTS

| JP | 2763384 | 3/1998 |
|---|---|---|
| JP | 2004-525476 | 8/2004 |
| KR | 10-2004-0015176 | 2/2004 |
| WO | WO02/089131 A1 | 7/2002 |

OTHER PUBLICATIONS

Copy of the Office Action issued on Jul. 26, 2006 for the corresponding Korean Patent Application No. 2006-03067616.

* cited by examiner

*Primary Examiner*—Hung Van Duong
(74) *Attorney, Agent, or Firm*—Beyer, Weaver & Thomas, LLP.

(57) ABSTRACT

When a recording medium is inserted into an insertion part, a locking part of a pull-in member locks a concave part of the recording medium because a pressed part is pressed to move a moving member. Simultaneously, a first switching member is switched, and a cam member rotates to move a power transmission means into the inside of an apparatus (Y1-direction). Thereby, since the moving member having the pull-in member mounted thereon also moves, the recording medium can be carried into the inside of the apparatus. If the recording medium is abnormally orientated, the locking part can lock the concave part. Therefore, the recording medium can be prevented from being carried into the inside of the apparatus.

17 Claims, 7 Drawing Sheets

RECORDING MEDIUM MOUNTING APPARATUS

BACKGROUND OF THE INVENTION

1. Field of the Invention

The present invention relates to a recording medium mounting apparatus into which a recording medium such as a removable hard disk is loaded, and more specifically, to a recording medium mounting apparatus comprising an auto-loading mechanism.

2. Description of the Related Art

Recently, while networks which are rapidly spreading are made broadband, the cost of high-performance personal computers (PCs) is reduced, digital still cameras and digital video cameras are permeated into homes, and broadcasts are digitalized, information including videos, music, and pictures are being digitalized in our neighborhood. Further, information processing equipments, such as televisions and telephones, which can be connected to personal computers and Internets on television screens also have entered a new phase which goes beyond conventional categories.

Up to now, 3.5-inch-type fixed hard disk drives are used as recording media for recording a high capacity of information in a field of audio/video (AV) equipments. However, the above-mentioned fixed hard disk drives cannot cope with a large increase in capacity that is being rapidly progressed.

Meanwhile, a removable hard disk drive of 2.5-inch type or 1.8-inch type has been developed by the aid of recent high-density techniques.

In such a removable hard disk, a drive mechanism for causing rotation of a disk and a magnetic head for performing recording and reproducing are built inside the removable hard disk. Thus, the delivery of signals between the removable hard disk and external equipment (recording medium mounting apparatus) having the removable hard disk loaded thereinto is generally performed only via connectors.

Accordingly, when the removable hard disk is mounted on the recording medium mounting apparatus, a connector at the removable hard disk is required to be mounted on a connector at the recording medium mounting apparatus. Further, when the removable hard disk is removed, the connector at the removable hard disk is required to be separated from the connector at the recording medium mounting apparatus. Such a technique is disclosed in, for example, Japanese Unexamined Patent Application Publication No. 4-47554, etc.

However, according to the disclosure in Japanese Unexamined Patent Application Publication No. 4-47554, there is a problem in that a user is burdened with inconvenience in use that a user should manually mount a connector at a recording medium, such as a removable hard disk, on a connector at a recording medium mounting apparatus.

Further, since the entire recording medium cannot be accommodated into the apparatus due to the manual insertion, a part of the recording medium is apt to protrude to the outside of the apparatus. For this reason, if an external force is applied to a part of the recording medium, there is a problem in that data errors or data destruction is caused.

Moreover, if a recording medium is loaded in an abnormal orientation, it is necessary to prevent the recording medium from being carried into the inside of the apparatus.

In addition, in case a loading mechanism for automatically carrying a recording medium is taken into consideration, it is necessary to consider simple construction and miniaturization, and it is also necessary to reliably establish a connection between a connector of a recording medium and a connector of a mounting apparatus.

SUMMARY OF THE INVENTION

The present invention has been made to solve the above conventional problems. It is therefore an object of the present invention to provide a recording medium mounting apparatus comprising a loading mechanism which makes it possible to automatically carry a recording medium having a connector.

Further, it is another object of the present invention to provide a recording medium mounting apparatus which can prevent a recording medium from being carried into the inside of the apparatus, if the recording medium is loaded in an abnormal state.

Further, it is still another object of the present invention to provide a recording medium mounting apparatus which can reliably perform miniaturization and connection between connectors.

The present invention provides a recording medium mounting apparatus which a recording medium provided with an external connecting part is mounted on or demounted from, the apparatus comprising: an insertion part having the recording medium inserted thereinto; a connector connected to the external connecting part; and a loading mechanism which carries the recording medium in an insertion direction from the insertion part to a mounting completion position where the external connecting part is connected to the connector, the loading mechanism including: a pull-in member which locks the recording medium and pulls in the recording medium in the insertion direction; a moving member which moves the pull-in member; and a driving motor which drives the moving member.

According to the present invention, since a recording medium is automatically carried into the apparatus simply by loading the recording medium into the insertion part of the apparatus, the usability can be improved to lighten a user's burden. Further, since the entire recording medium carried is accommodated within the apparatus, an external force is not applied to a part of the recording medium during operation, so that occurrence of data errors and data destruction can also be prevented.

In the above construction, preferably, the pull-in member has a locking part which locks a concave part formed in a side face of the recording medium, the locking part is supported to be vertically rockable with respect to the moving member, and the rocking part goes into the concave part from the top to lock the recording medium.

According to the above means, since the concave part can be locked from the height direction of the recording medium, it is possible to provide a recording medium mounting apparatus whose width dimension is decreased.

More specifically, the moving member is formed with a pressed part which is pressed by the recording medium, and a transverse side part of the moving member orthogonal to the insertion direction is provided with a guiding member having an elongated guiding hole which guides the movement of the locking part of the pull-in member, a supporting hole which set the locking part to a unlocking state away from the concave part, and an inclined part which guides the locking part into the elongated guiding hole from the supporting hole to lead the locking part to a locking state in which the concave part is locked, and when the recording medium inserted into the insertion part presses the pressed part to move the moving member in the insertion direction, the locking part climbs down the inclined part from the supporting hole to lock the concave part of the recording medium.

According to the above means, since the concave part at the recording medium can be locked with a simple construction, it is possible to reliably carry the recording medium in the insertion direction.

Further, preferably, an edge of the supporting hole at the insertion side is formed with a regulating part which prevents the movement of the pull-in member in the insertion direction, when the locking part climbs down the inclined part.

According to the above means, if a recording medium is inserted in an abnormal orientation, the locking part cannot lock the concave part of the recording medium. Therefore, it is possible to prevent erroneous insertion of the recording medium.

Further, the present invention provides a recording medium mounting apparatus which a recording medium provided with an external connecting part is mounted on or demounted from, the apparatus comprising: an insertion part having the recording medium inserted thereinto; a connector connected to the external connecting part; and a loading mechanism which carries the recording medium in an insertion direction from the insertion part to a mounting completion position where the external connecting part is connected to the connector, the loading mechanism including: a cam member having a first sliding groove and rotatably supported; a driving motor which rotates the cam member; a moving gear having a sliding pin which moves along the first sliding groove of the cam member; a moving member which is moved according to the movement of the moving gear; a pull-in member which is mounted on the moving member to lock and pull in the recording medium, and a power conversion means which converts a moving force of the moving gear into a moving force of the moving member.

According to the present invention, a plurality of members can be moved simply by rotating one cam member. Thus, since it is unnecessary to provide separate gear mechanisms exclusive for respective members, it is possible to reduce the frequency of occurrence of failures.

The power conversion means can have a sliding member which moves while rotatably supporting the moving gear, a base member provided with a first rack part which meshes with the moving gear and causes rotation according to the movement of the sliding member, and a second rack part which is provided integrally with or separately from the moving member and which meshes with the moving gear to apply a moving force in the insertion direction to the moving member.

According to the above means, since the traveling distance of the sliding member can be reduced to about half of the traveling distance of the recording medium, the entire apparatus can be miniaturized.

Further, the power transmission means can be provided with a movable member having the second rack part, and the moving member and the movable member can be connected to each other via a first biasing member.

In the above construction, preferably, the moving gear is a two-stage gear which is integrally formed coaxially with the a small-diameter gear and a large-diameter gear, the small-diameter gear meshes with the first rack part, and the large-diameter gear meshes with the second rack part.

According to above means, since the ratio (gear ratio) is caused between the number of teeth of the small-diameter gear and the number of teeth of the large-diameter gear, it is possible to make the traveling distances of the moving member and the movable member larger than the traveling distance of the sliding member having the moving gear mounted thereon. Therefore, the traveling distance of the sliding member can be reduced to about half of the traveling distances of the recording medium and the moving member holding the same. As a result, the entire apparatus can be miniaturized.

Further, preferably, the moving member is formed with a pressed part which abuts on the recording medium, and a second biasing member which biases the sliding member in a direction opposite to the insertion direction is provided between the sliding member and the base member, and the first sliding groove is formed with a widened part which allows movement of the sliding pin mounted on the sliding member, when the recording medium inserted into the insertion part presses the pressed part to slightly move the moving member in the insertion direction against the second biasing member.

According to the above means, since the second biasing member functions as a damper, and the sliding member can move in the insertion direction according to an insertion force to the recording medium, it is possible to improve a sense of insertion that a user feels when inserting a recording medium.

Moreover, preferably, the recording medium mounting apparatus further comprises: a first switching member which detects whether or not the recording medium is locked by the pull-in member; a second switching member which detects from a rotation angle of the cam member whether or not the sliding member is moved to an insertion standby position which is the insertion part side; and a third switching member which detects from the rotation angle of the cam member whether or not the recording medium inserted into the insertion part is moved to the mounting completion position where the external connecting part is fitted to the connector.

According to the above means, a control unit can detect an operating state of the entire apparatus. As a result, it is possible to prevent occurrence of a failure in advance.

For example, the cam member can be formed with a second sliding member, and can be provided with a rocking member which has a control pin which slides along the second sliding groove, and which switches switching states of the second switching member and the third switching member according to the rotation angle of the cam member.

Further, when the recording medium is moved in the insertion direction, the external connecting part can be fitted to the connector in an imperfect state, to limit the movement of the moving member by an insertion load caused therebetween, then only the movable member can be moved to the mounting completion position to cause a tension in the first biasing member, and when the tension exceeds the insertion load, the external connecting part can be completely fitted to the connector.

According to the above means, the tension of the biasing member can be supplementarily applied in addition to a large pull-in force caused by the pull-in member. Further, the insertion connector at the recording medium can be completely fitted to the internal connector at the apparatus with larger mounting force. Therefore, it is possible to reliably perform the mounting between the insertion connector and the internal connector.

Further, the present invention provides a recording medium mounting apparatus which a recording medium provided with an external connecting part is mounted on or demounted from, the apparatus comprising: an insertion part having the recording medium inserted thereinto; a connector connected to the external connecting part; and a loading mechanism which carries the recording medium in an insertion direction from the insertion part to a mounting completion position where the external connecting part is connected to the connector, the loading mechanism including: a moving unit which moves the recording medium in the insertion direction; and a connecting part which connects the external connecting part to the connector, the connecting part being formed so as to apply a force larger than that applied to the moving unit to the recording medium.

According to the present invention, when the external connecting part of the recording medium is fitted to the connector at the apparatus, it is possible to generate a larger force than a force which moves the recording medium from the insertion part to the inside of the apparatus. Therefore, it is possible to reliably perform the mounting between the insertion connector and the internal connector.

Specifically, the loading mechanism have a cam member which is rotated by a driving motor, and the cam member can be a cam groove in which a first cam groove functioning as the moving unit, and a second cam groove functioning as the connecting part are continuously provided. Further, the first cam groove can be formed in a shape of a large arcuate groove which is provided at the outer peripheral side of the cam member and has a large radius of curvature, and the second cam groove can be formed in a shape of a small arcuate groove which is provided more toward the inner peripheral side than the first cam groove and has a small radius of curvature.

According to the above means, since it is possible to utilize characteristics of a rotating cam member that a torque generated in the second cam grove at the inner peripheral side is larger than that generated in the first cam groove at the outer peripheral side, it is possible to reliably perform connection and movement of a recording medium with simple construction. Moreover, since the first cam groove and the second cam groove are formed as a continuous cam groove, it is possible to shift a recording medium from its carrying operation to its connecting operation between connectors.

In the above construction, preferably, the loading mechanism is provided with a moving member which has a pressed part abutting on the recording medium and a pull-in member locking the recording medium, and which moves in the insertion direction, a sliding pin which slides in the first cam groove and the second cam groove, a sliding member which has the sliding pin mounted thereon and moves along with the sliding pin, a base member on which the sliding member slides, and a biasing member which is provided between the sliding member and the base member to bias the sliding member in a direction opposite to the insertion direction, and the first cam groove is formed with a widened part which allows movement of the sliding pin, when the recording medium inserted into the insertion part presses the pressed part to slightly move the moving member in the insertion direction against the second biasing member.

According to the above means, since the biasing member functions as a damper, and the sliding member can move in the insertion direction according to an insertion force to the recording medium, it is possible to improve a sense of insertion that a user feels when inserting a recording medium.

In the above construction, the recording medium mounting apparatus further comprises: a first switching member which detects whether or not the recording medium is locked by the pull-in member, a second switching member which detects from a rotation angle of the cam member whether or not the sliding member is moved to an insertion standby position which is the insertion part side; and a third switching member which detects from the rotation angle of the cam member whether or not the recording medium inserted into the insertion part is moved to the mounting completion position where the external connecting part is fitted to the connector.

According to the above means, a control unit can detect an operating state of the entire apparatus. As a result, it is possible to prevent occurrence of a failure in advance.

According to a first aspect of the present invention, the loading mechanism is included, so that entrance and exit of a recording medium can be facilitated and a user's burden can be lightened, thereby providing a recording medium mounting apparatus with improved usability. Further, since the entire recording medium can be accommodated within the apparatus, an external force is not applied to a part of the recording medium during operation, so that occurrence of data errors and data destruction can also be prevented.

Further, according to a second aspect of the present invention, since the concave part of the recording medium can be locked by the locking part from the height direction of the recording medium, it is possible to decrease, particularly, the width dimension of a recording medium mounting apparatus.

Further, according to a third aspect of the present invention, it is possible to reliably lock the concave part at the recording medium by the locking part of the pull-in member with a simple construction in that the guiding member is formed with the inclined part.

Moreover, according to a fourth aspect of the present invention, when a recording medium with its abnormal orientation is inserted, the regulating member can prevent the pull-in member from moving in the insertion direction. Therefore, it is possible to prevent the recording medium from being carried into the inside of the apparatus.

According to a fifth aspect of the present invention, since it is unnecessary to provide separate gear mechanisms exclusive for respective members, and it is possible to drive the respective members simply by using one cam member, it is possible to simplify the construction of the loading mechanism. As a result, it is possible to reduce the frequency of occurrence of failures.

According to a sixth aspect of the present invention, since the traveling distance of the sliding member can be reduced to about half of the traveling distance of the recording medium, it is possible to reduce the dimension of the apparatus in the insertion direction.

According to a seventh aspect of the present invention, when the recording medium is carried into the apparatus by the loading mechanism, it is possible to generate a large mounting force by a pull-in force of the loading mechanism and a tension of the biasing member. Therefore, the connector at the recording medium can be reliably fitted to the connector within the apparatus.

According to an eighth aspect of the present invention, the ratio between the number of teeth of the small-diameter gear and the number of teeth of the large-diameter gear is caused, so that the traveling distance of the sliding member having the moving gear mounted thereon can be made smaller than the traveling distances of the moving member and the movable member. Therefore, the traveling distance of the sliding member can be reduced to about half of the traveling distances of the recording medium and the moving member holding the same. As a result, the entire apparatus can be miniaturized.

Further, according to a ninth aspect of the present invention, since the moving member can be elastically moved according to an insertion force of the recording medium, it is possible to improve a sense of insertion that a user feels, that is, the operability.

Further, according to a tenth aspect of the present invention, since the control unit can detect an operating state of the entire apparatus from states of the respective switches, it is possible to reduce the frequency of occurrence of failures.

Further, according to an eleventh aspect of the present invention, it is possible to reliably switch the second switching member and the third switching member.

Moreover, according to a twelfth aspect of the present invention, since the external connecting part can be completely fitted to the connector with a larger force, it is possible to perform mounting between the connector at the recording medium and the connector at the apparatus.

According to a thirteenth aspect of the present invention, when the external connecting part of the recording medium is fitted to the connector at the apparatus, a force which is large than a force when the recording medium is moved from the insertion part toward the inside of the apparatus is generated. Therefore, the external connecting part can be reliably fitted to the connector.

Further, according to fourteenth and fifteenth aspects of the present invention, characteristics of the rotating cam member are utilized, so that the recording medium can be carried, and the external connecting part can be completely fitted to the connector with a larger force.

Moreover, according to a sixteenth aspect of the present invention, since the biasing member can be made function as a damper, when the recording medium is inserted, the moving member can move in the insertion direction against the biasing member. As a result, it is possible to improve a sense of insertion that a user feels when inserting the recording medium.

According to a seventeenth aspect of the present invention, even when the damper function is included, since the control unit can detect an operating state of the entire apparatus from states of the respective switches, it is possible to reliably perform respective operations in various apparatuses.

DESCRIPTION OF THE PREFERRED EMBODIMENT

Figure 1:
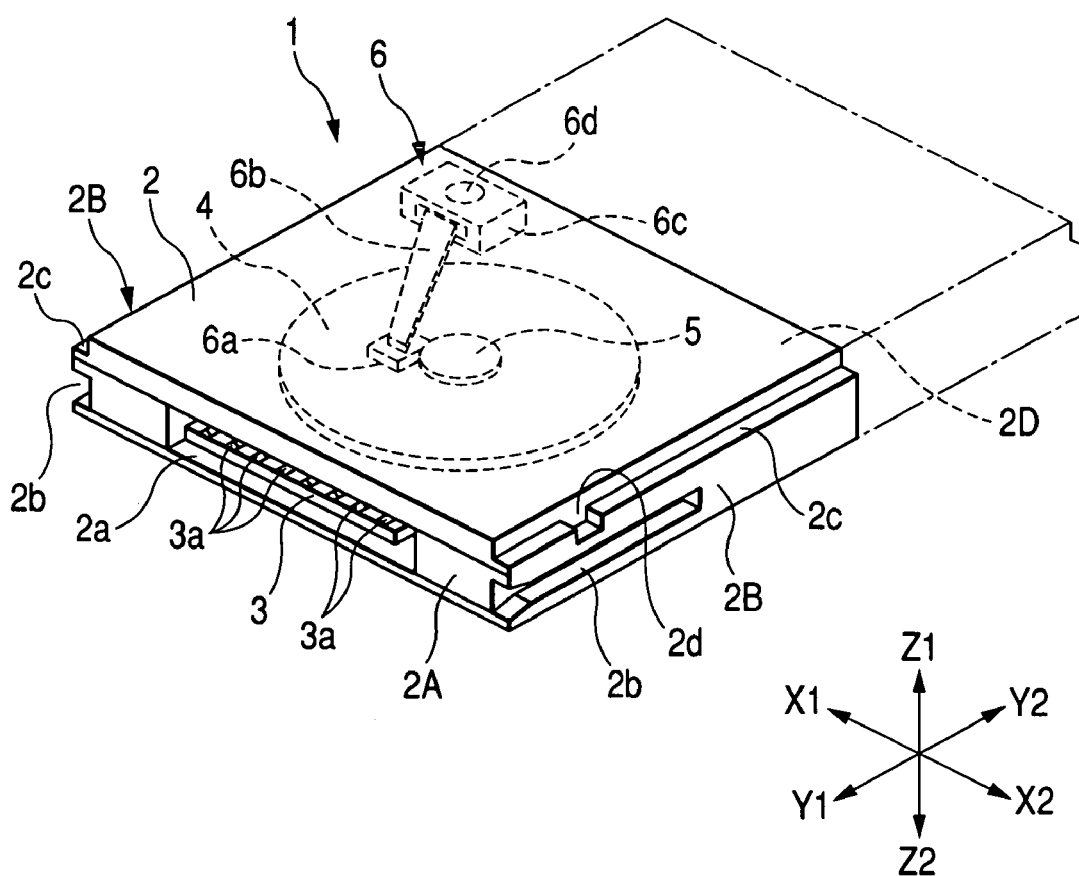
FIG. 1 is a perspective view showing the appearance of a recording medium to be mounted on a recording medium mounting apparatus.
Figure 2:
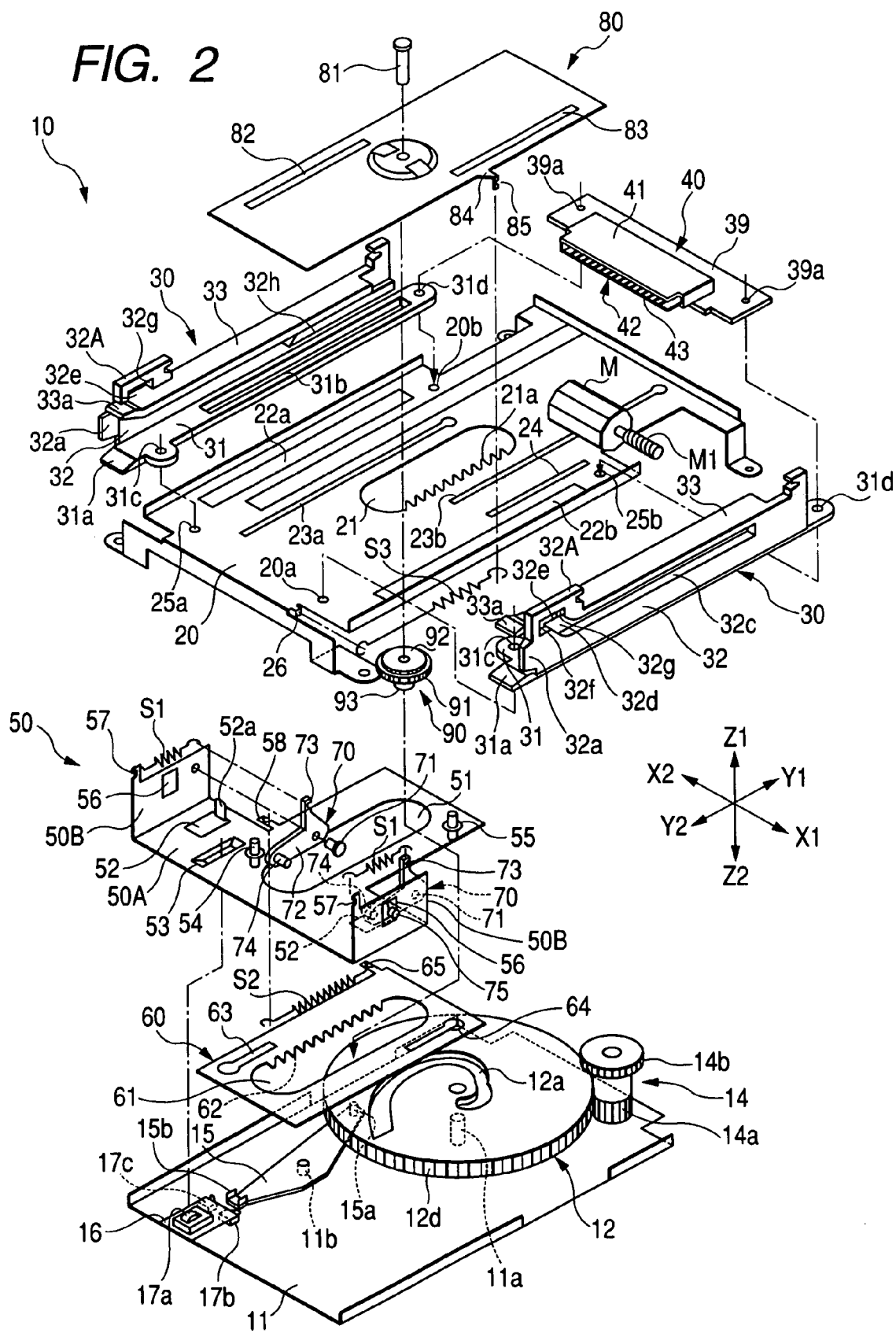
FIG. 2 is an exploded perspective view showing an internal structure of the recording medium mounting apparatus according to an embodiment of the present invention.
Figure 3:
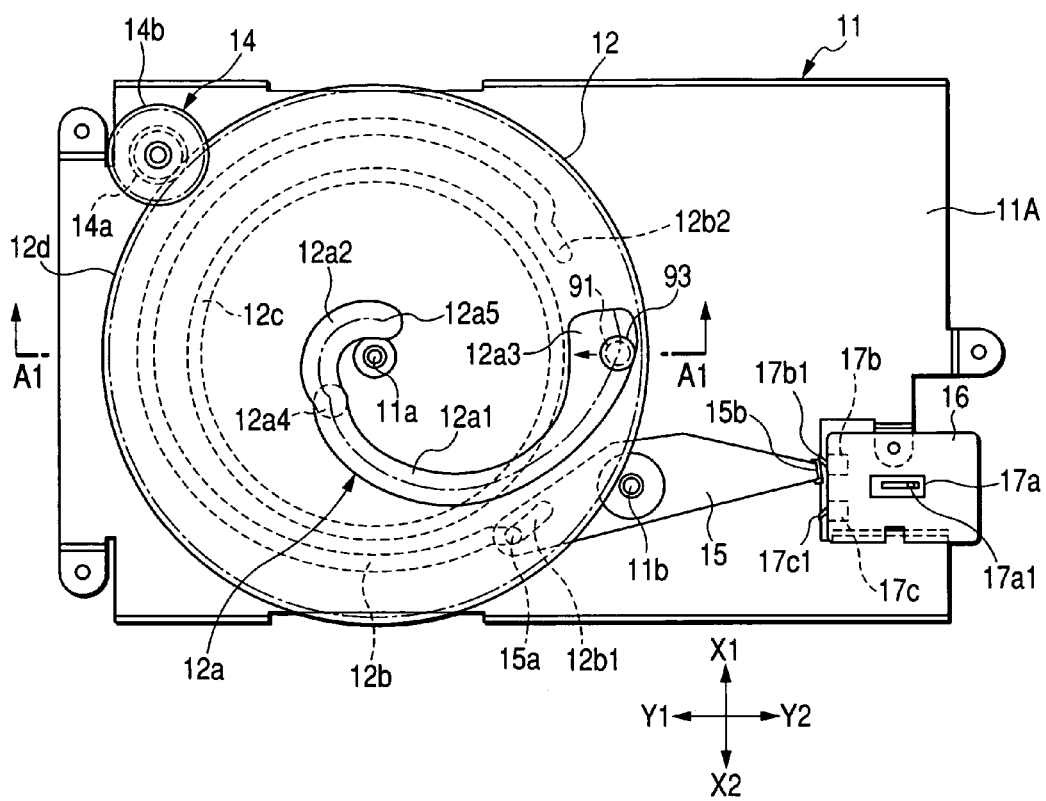
FIG. 3 is a plan view showing a lower chassis and a cam member.
Figure 4:
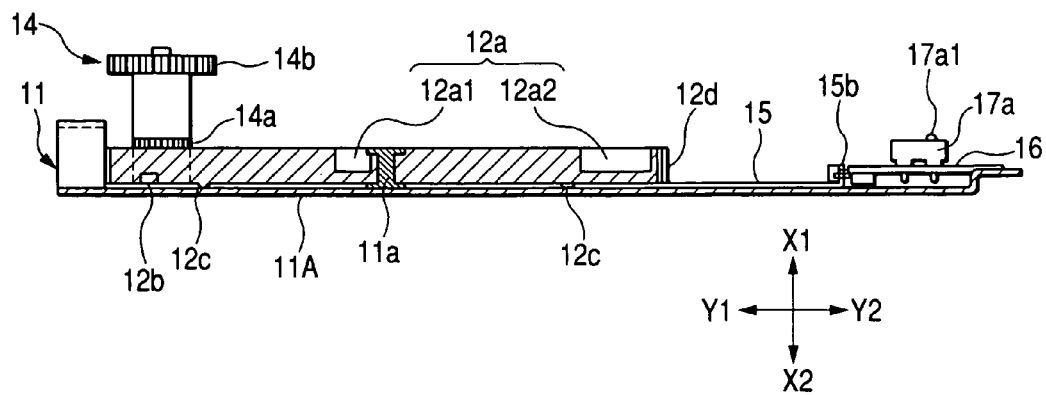
FIG. 4 is a cross-sectional view mainly taken along the line A1—A1 in FIG. 3.

FIG. 1 is a perspective view showing the appearance of a recording medium to be mounted on a recording medium mounting apparatus, FIG. 2 is an exploded perspective view showing an internal structure of the recording medium mounting apparatus according to an embodiment of the present invention, FIG. 3 is a plan view showing a lower chassis and a cam member, and FIG. 4 is a cross-sectional view mainly taken along the line A1—A1 in FIG. 3.

First, a recording medium to be mounted on a recording medium mounting apparatus will be described.

What is to be mounted on the recording medium mounting apparatus shown after FIG. 2 is, for example, a removable recording medium 1 as shown in FIG. 1. The recording medium 1 has a thin cubic cartridge 2. The recording medium 1 includes, for example, a standardized removable hard disk, such as 1.8-inch-type (small-sized) hard disk which is indicated by solid lines in FIG. 1, a 2.5-inch-type (large-sized) hard disk which is longer than the 1.8-inch-type hard disk in the Y-direction, and is indicated by one-dot chain lines in FIG. 1, etc. In addition, the 1.8-inch-type removable hard disk has a storage capacity of, for example, 40 Gbytes, and the 2.5-inch-type removable hard disk has a storage capacity of, for example, 80 Gbytes.

The cartridge 2 is formed of, for example, a synthetic resin material. A front face 2A of the cartridge 2 at the Y1-side is formed with an opening 2a, and an insertion connector (an external connecting part) 3 for connection is provided in the opening 2a. Guide grooves 2b and 2b, which extend in the Y-direction in the drawing, are formed at front positions at the Y1-side of sides 2B and 2B of the cartridge 2 in the X1 and X2 directions. Also, stepped portions 2c and 2c, which extend in the Y-direction similar to the guide grooves, are respectively formed above the guide grooves 2b and 2b (at the Z1-side). The stepped portions 2c and 2c are respectively formed with concave parts 2d and 2d which function as locked parts.

As shown in FIG. 1, a magnetic disk 4, and a rotational driving means 5, such as a spindle motor, which rotationally drives the magnetic disk 4 are provided inside the cartridge 2.

A magnetic head device 6 is built in the cartridge 2. The magnetic head device 6 has a magnetic head chip 6a which faces a magnetic recording surface of the magnetic disk 4, a load beam 6b which applies a predetermined load pressure to the magnetic head chip 6a, and an access actuator 6c which rotates a shaft 6d of the load beam 6b.

The magnetic head chip 6a is provided with a slider which faces the recording surface of the magnetic disk 4, a read unit using a magneto-resistance effect element attached to the slider, a write unit using a thin-film inductive head. The magnetic head chip 6a takes a posture that slightly floats by an air bearing above the surface of the magnetic disk 4 which rotates at high speed during a recording operation of digital signals onto the recording medium 1, or during a reproducing operation of digital signals from the recording medium 1. Also, the load beam 6b is operated to rock by the access actuator 6c, to retrieve the center of the recording surface of the magnetic disk 4, so that the read unit and the write unit track on the recording surface to perform the read operation and the write operation.

Further, a circuit board is mounted in the cartridge 2. This circuit board is mounted with a control circuit which controls the driving of the rotational driving means 5, a control circuit which controls the operation of the magnetic head device 6, a digital signal processing circuit which formats write signals and formats read signals, an interface unit, etc.

The insertion connector 3 illustrated in this embodiment is of, for example, a slot-in type in which a plurality of conducting parts 3a, which extends in the Y-direction on both sides of the circuit board are arranged at predetermined intervals in the X-direction. However, the insertion connector 3 may be of a type in which a plurality of connecting pins is provided.

Next, the recording medium mounting apparatus of the present invention will be described.

Figure 5:
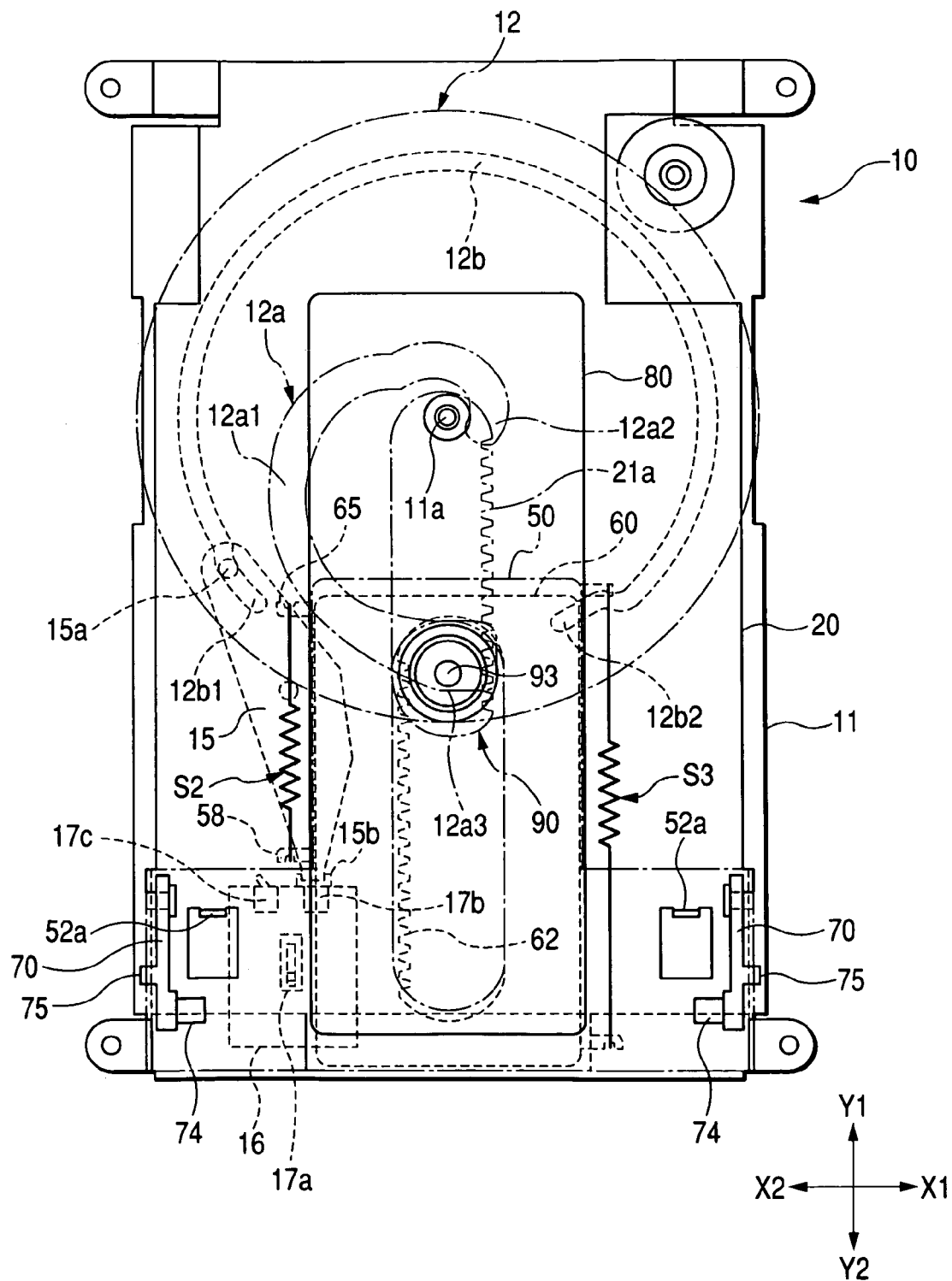
FIG. 5 is a plan view of the recording medium mounting apparatus showing an initial state before the recording medium is inserted.
Figure 6:
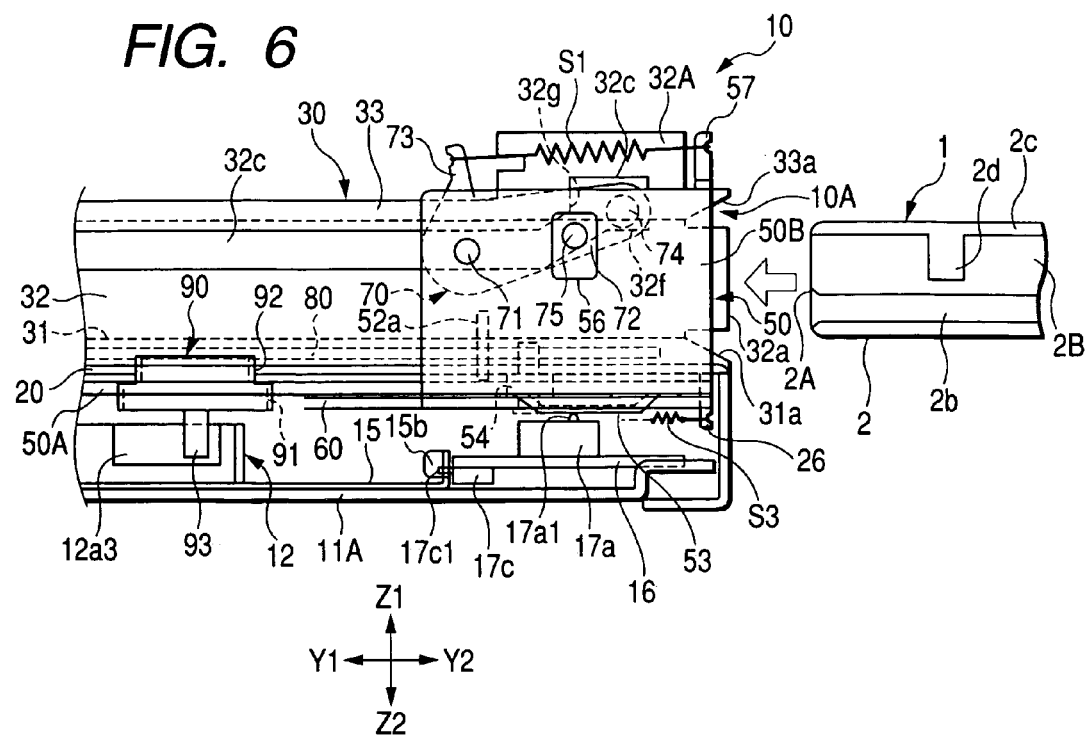
FIG. 6 is a partial side view of the recording medium mounting apparatus in the initial state.
Figure 7:
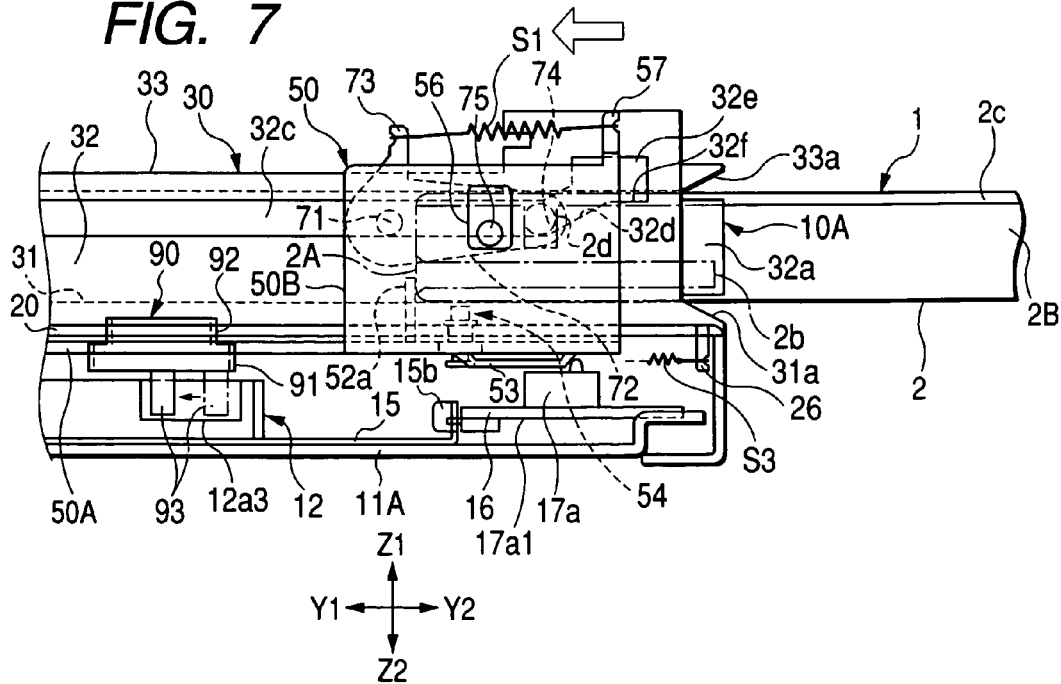
FIG. 7 is a partial side view similar to FIG. 6, showing a state in which the recording medium is inserted and is locked by a pull-in member.
Figure 8:
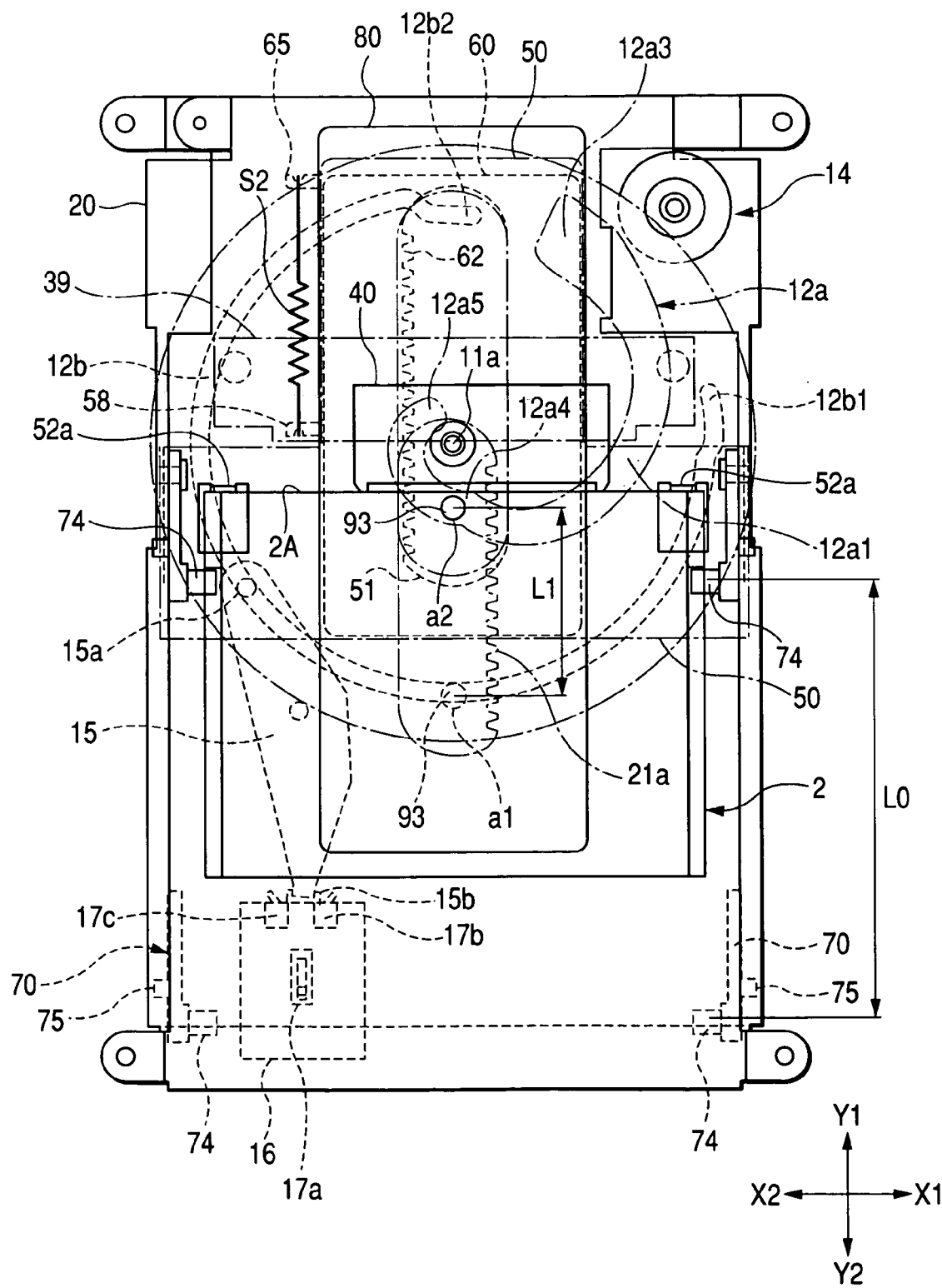
FIG. 8 is a plan view similar to FIG. 5, showing a state immediately before an insertion connector at the recording medium is connected to an internal connector at the apparatus.
Figure 9:
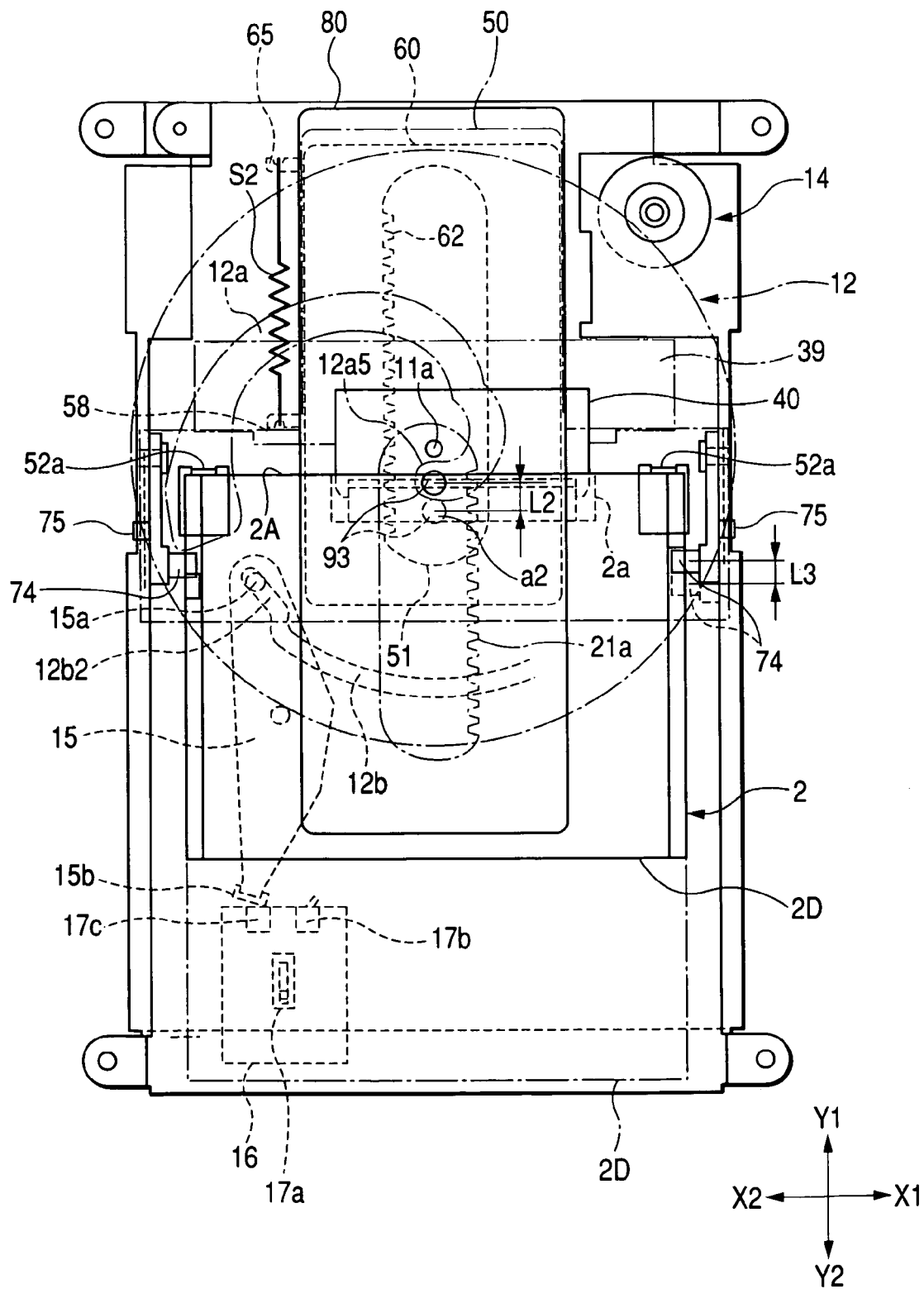
FIG. 9 is a plan view similar to FIG. 5, showing a state in which the insertion connector at the recording medium is connected to the internal connector at the apparatus.

FIG. 5 to FIG. 9 show various kinds of operation in the recording medium mounting apparatus. FIG. 5 is a plan view of the recording medium mounting apparatus showing an initial state before the recording medium is inserted, FIG. 6 is a partial side view of the recording medium mounting apparatus in the initial state in FIG. 5, FIG. 7 is a partial side view similar to FIG. 6, showing a state in which the recording medium is inserted and is locked by a pull-in member, FIG. 8 is a plan view similar to FIG. 5, showing a state immediately before the insertion connector at the recording medium is connected to an internal connector at the apparatus, and FIG. 9 is a plan view similar to FIG. 5, showing a state in which the insertion connector at the recording medium is connected to the internal connector at the apparatus.

A recording medium mounting apparatus 10 of the present invention is installed in a body (not shown) of equipment, such as a computer, or indoor or onboard AV equipment. The recording medium mounting apparatus 10 performs reproducing and recording of digital data between the recording medium 1 and the equipment body.

As shown in FIG. 2, the recording medium mounting apparatus 10 has a lower chassis 11 provided at its lower side (at the Z2-side), and has a base chassis 20 provided at its upper side (at the Z1-side). Both the chassis 11 and 20 arranged to face each other parallel to each other.

A bottom plate 11A of the lower chassis 11 is provided with a shaft 11a. A large disklike cam member 12 is rotatably supported by the shaft 11a. As shown in FIG. 3 and FIG. 4, the front face of the cam member 12 (its face at the Z1-side) is formed with a first sliding groove 12a, and the rear face of the cam member 12 (its face at the X2-side) is formed with a second sliding groove 12b and a sliding rib 12c. Further, teeth 12d are provided at the outer peripheral face of the cam member 12.

As shown in FIG. 3, the first sliding groove 12a is formed by connecting two types of arcuate grooves with each other, which connects the inner periphery and the outer periphery of the first sliding groove with each other. Specifically, the outer periphery of the surface of the cam member 12 is formed with a large arcuate groove 12a1 with a large radius of curvature by about half of the circumference. The inner periphery of the surface of the cam member is formed with a small arcuate groove 12a2 with a smaller radius of curvature than the large arcuate groove 12a1 by about half of the circumference. Also, a part transited from the large arcuate groove 12a1 to the small arcuate groove 12a2 is a connecting part 12a4.

Further, the first sliding groove 12a at its outer peripheral side (at the outer peripheral side of the large arcuate groove 12a1) is formed with a widened part 12a3 such that its groove width is larger than that of the groove width of the first sliding groove at its inner peripheral side and that of the small arcuate groove 12a2. In addition, an innermost peripheral part 12a5 of the first sliding groove 12a (an innermost peripheral part of the small arcuate groove 12a2) is formed at a position close to the shaft 11a.

The second sliding groove 12b is formed on the rear face of the cam member 12 (its face at the Z2-side) with a predetermined diameter about the shaft by about ¼ of the circumference. Here, an outer peripheral end 12b1 that is one end of the second sliding groove 12b is formed to have a slightly larger diameter than the predetermined diameter. An inner peripheral end 12b2 that is the other end of the second sliding groove is formed to have a slightly smaller diameter than the predetermined diameter. Also, a widened part 12a3 is formed between the outer peripheral end 12b1 and the inner peripheral end 12b2 of the second sliding groove 12b so as to form the outer periphery of the first sliding groove 12a.

The sliding rib 12c is formed in a shape of a rib inside the second sliding groove 12b. As shown in FIG. 4, the sliding rib has a convex sectional shape which protrudes in the Z2-direction in the drawing. Specifically, the cam member 12 is adapted to rotate about the shaft 11a while the sliding rib 12c slides on the bottom plate 11A of the lower chassis 11. The sliding rib 12c reduces a frictional resistance during its sliding.

A cylindrical transfer gear 14 is rotatably provided on the base plate 11A of the lower chassis 11 in the vicinity of the cam member 12. Teeth 14a formed at the bottom of the transfer gear 14 meshes with the teeth 12d of the cam member 12. An upper end of the transfer gear 14 is integrally formed with a large-diameter gear 14b. As shown in FIG. 2, the gear 14b meshes a worm gear M1 of a driving motor M which is fixed on the base chassis 20. Thus, the power generated by the driving motor M is transmitted via the transfer gear 14, to rotate the cam member 12 clockwise or counterclockwise in the circumferential direction.

As shown in FIG. 1 and FIG. 3, a rocking shaft 11b is provided on the bottom plate 11A of the lower chassis 11 and in the vicinity of the outer peripheral part of the cam member 12. A rocking member 15 is rockably supported by the rocking shaft 11b. One end of the rocking member 15 is inserted into a gap between the bottom plate 11A and the cam member 12. The one end of the rocking member 15 is provided with a control pin 15a which protrudes in the Z1-direction in the drawing. The control pin 15a is inserted into the second sliding groove 12b provided at the rear face of the cam member 12. Further, the other end of the rocking member 15 is provided with a pressing part 15b which is formed by being bent in the Z1-direction in the drawing.

As shown in FIG. 1, FIG. 3 and FIG. 4, a board 16 is provided at a front position of the lower chassis 11 at the Y1-side in the drawing. The top face of the board 16 is provided with a first switching member 17a, and the bottom face of the board 16 is provided with a second switching member 17b and a third switching member 17c. The first switching member 17a is provided with an actuator 17a1 which is provided to protrude in the Z1-direction in the drawing and to advance or retreat in the Z-direction. The first switching member 17a is a member whose state is switched whenever the actuator 17a1 is pressingly operated. Meanwhile, the second switching member 17b and the third switching member 17c are juxtaposed in the X-direction at an edge of the board 16 at the Y1-side. The second and third switching members 17b and 17c respectively have actuators 17b1 and 17c1 which protrude in the Y1-direction in the drawing from the edge of the board 16. The actuators 17b1 and 17c1 are members whose states are switched whenever they are operated in the X1 and X2 directions in the drawing. Also, the pressing part 15b of the rocking member 15 is disposed at front positions of the actuators 17b1 and 17c1 to face them.

When the cam member 12 rotates clockwise in FIG. 3 to the maximum, and the control pin 15a reaches the outer peripheral end 12b1 of the second sliding groove 12b, the rocking member 15 is rocked counterclockwise about the rocking shaft 11b. At this time, since the pressing part 15b presses the actuator 17b1 of the second switching member 17b in the X1-direction in the drawing, the switching state of the second switching member 17b is switched.

Further, when the cam member 12 rotates counterclockwise to the maximum, and the control pin 15a reaches the inner peripheral end 12b2 of the second sliding groove 12b, the rocking member 15 is rocked clockwise. At this time, since the pressing part 15b presses the actuator 17c1 of the third switching member 17c in the X2-direction in the drawing, the switching state of the third switching member 17c is switched. Also, when the control pin 15a is located in the second sliding groove 12b other than the outer peripheral end 12b1 and the inner peripheral end 12b2, the pressing part 15b of the rocking member 15 is set to a neutral position which does not touch any one of the second switching member 17b and the third switching member 17c.

Thus, a control unit can detect whether or not the cam member 12 is at its initial state (see FIG. 5) which has rotated clockwise to the maximum, at its mounting completion state (see FIG. 9) which has rotated counterclockwise to the maximum, and at its loaded state other than those states (see FIG. 8).

In addition, switching signals which show respective switching states of the first to third switching members 17a, 17b and 17c are sent out to a control unit (not shown) which is provided in the equipment body.

As shown in FIG. 2, the base chassis 20 is formed by pressing and stamping a metal plate. An open hole 21 is bored at the center of the base chassis 20 so as to open in a substantially oval shape. A first rack part 21a is formed on an edge of the open hole 21 at the X1-side. Elongated holes 22a and 22b, which extend in the Y-direction in the drawing, are formed at symmetrical positions at both ends of the base chassis 20 in its transverse direction (in the X1 and X2 directions). Pressed parts 52a and 52a, which are formed in a moving member 50 to be described later, are respectively inserted through the elongated holes 22a and 22b. Further, elongated guiding holes 23a and 23b, which extend in the Y-direction, are formed at both sides of the open holes 21, respectively. An elongated hole 24, which extends in the Y-direction, is also formed between the one elongated guiding hole 23b and the one elongated guiding hole 23b.

A pair of guiding members 30 and 30 formed of a synthetic resin, etc., is fixed to both ends of the base chassis 20 in its transverse direction. Each guiding member 30 is formed to have a U-shaped section which surrounds three faces including a bottom face 31, a side face 32 and a top face 33. Also, the side face 32 and the top face 33 are formed to extend in the Y-direction in the drawing. Also, the side parts of the cartridge 2 in the X1 and X2 directions are inserted into a space surrounded by the three faces. Inclined faces 31a, 32a and 33a are respectively formed at front ends of the three faces including the bottom face 31, the side face 32 and the top face 33. A portion which is surrounded by the inclined faces 31a, 32a and 33a constitutes an insertion part 10A of the recording medium mounting apparatus 10.

An elongated hole 31b and mounting holes 31c and 31d, which extends in the Y-direction in the drawing, are formed in the bottom face 31. When the mounting holes 31c and 31d are respectively positioned within fixing holes 25a and 25b formed in the base chassis 20, and fixed therein with screws, the elongated holes 22a and 22b of the base chassis 20 and the elongated holes 31b and 31b overlap each other, respectively.

An extending side face 32A, which protrudes in the Z1-direction from the side face 32, is integrally formed at a front position of the side face 32. The side face 32 is formed with an elongated guiding hole 32c extending in the Y-direction. A front end of the elongated guiding hole 32c in the Y2-direction is formed with an inclined part 32d which extends so as to be continued from the elongated guiding hole 32c and be inclined upward (in the Z1 direction). A rectangular supporting hole 32e continued with the inclined part 32d is formed at a position which extends over the side face 32 and the extending side face 32A. In addition, a lower end of the supporting hole 32e at the Y2-side is a supporting part 32f, and an edge thereof at the Y1-side is a regulating part 32g. Further, an inner wall of the side face 32 at the Y1-side is formed a guiding projection 32h which protrudes inward convexly in the drawing and extends in the Y-direction in the drawing.

An internal connector 40 as a receiving part is provided in the base chassis 20 while it is fixed on a board 39. The internal connector 40 has an insulating sheathing cover 41 which covers the entirety thereof. A front part of the sheathing cover 41 (at the Y1-side) is a connecting part 42, and an opening 43 is formed inside the connecting part 42.

The internal connector 40 includes, for example, a connector of type in which a plurality of conductive connecting terminals having elasticity are juxtaposed in the transverse direction on upper and lower faces of the opening 43, and when the insertion connector 3 at the recording medium 1 is inserted into the opening 43, the respective connecting terminals contact the respective conducting parts 3a of the insertion connector 3 formed on both the front and rear faces of the board while they elastically pressing them. Otherwise, the internal connector includes, for example, a connector of type in which the insertion connector 3 at the recording medium 1 are connecting pins, a plurality of receptacles into which the connecting pins can be inserted are arranged.

Screw holes 39a and 39a are bored at both ends of the board 39 in its transverse direction. The board 39 is tightened and fixed with screw members (not shown) in a state in which the screw holes 39a and 39a overlap the mounting holes 31d and 31d, respectively, of the guiding member 30.

As shown in FIG. 2, the moving member 50 and a movable member 60 are provided between the lower chassis 11 and the base chassis 20. The moving member 50 has a base part 50A which is formed in a 'T' shape in plan view by bending a metal plate, and side parts 50B and 50B which is formed by vertically bending both ends of a wide portion of the base part 50A. An open hole 51, which opens in a substantially oval shape, is formed at the center of the base part 50A. Further, cutaway holes 52 and 52 are respectively formed in the vicinity of the side parts 50B and 50B on the base part 50A. Edges of the cutaway holes 52 and 52 are formed with pressed parts 52a and 52a which are formed by vertically bending parts thereof. Moreover, the moving member 50 is provided with a pressing part 53 which is formed by sinking a part of the base part 50A in the Z2-direction. As shown in FIG. 6, the pressing part 53 is disposed to face the first switching member 17a.

Guiding pins 54 and 55, which protrude in up and down directions from the base part 50A, are respectively provided in the vicinity of the open holes 51 of the moving member 50. In addition, the function of the guiding pins 54 and 55 will be described later.

The side parts 50B and 50B of the moving member 50 are respectively formed with windows 56 and 56. Pull-in member 70 and 70 are respectively provided in the vicinity of the windows 56 and 56. Each pull-in member 70 is formed of, a synthetic resin, and is rotatably supported at a shaft 71 which is provided at a position of the side part 50B at the Y1-side.

The pull-in member 70 has an arm part 72 which extends in the Y2-direction in the drawing and a hooking piece 73 which extends in the Z1-direction in the drawing. Further, an inner face of a distal end of the arm part 72 is formed with an inwardly protruding locking part 74. Further, an outer face of the arm part 72 is formed with an outwardly protruding regulating projection 75 which is inserted into the window 56. Accordingly, the pull-in member 70 is supported to be vertically rockable about the shaft 71 in a range in which the regulating projection 75 abuts on upper and lower edges of the window 56. Ends of the side parts 50B and 50B of the moving member 50 in the Y2-direction are integrally formed with hooking pieces 57 and 57 which extend in the Z1-direction in the direction. The hooking pieces 57 and 57 are slightly inwardly bent, and biasing members S1 and S1 such as a coil spring is installed in their compressed state between the hooking pieces 57 and 57 and the hooking pieces 73 and 73 of the pull-in member 70. Thus, the pull-in member 70 is biased in a direction in which the distal end of the arm part 72 is rotated downward (in the Z2-direction) in the drawing.

The movable member 60 is formed of, for example, a metal plate. A central part of the movable member 60 is formed with an opening 61 which opens in a substantially oval shape. An edge of the opening 61 at the X2-side in the drawing is formed with a second rack part 62.

The dimension of the movable member 60 in its transverse direction (in the X-direction) is almost the same as that of the width of a narrow portion of the base part 50A of the moving member 50. The movable member 60 touches a lower face (the face at the Z2-side) of the base part 50A. Elongated guiding holes 63 and 64, which extend in the Y-direction in the drawing, are respectively formed at both sides of the opening 61 of the movable member 60. Lower ends of the guiding pins 54 and 55, which are provided in the moving member 50 are respectively inserted into the elongated guiding holes 63 and 64. The movable member 60 is supported on the lower face of the moving member 50 by the guiding pins 54 and 55, and is movable in the Y-direction along the elongated guiding holes 63 and 64.

A hooking part 65, which protrudes in the X2-direction in the drawing, is formed at edges of the movable member 60 at the X1-side and the X2-side. Also, a biasing member S2 such as a coil spring is installed between the hooking part 65 and the hooking part 58 provided on the side face of the base part 50A of the moving member 50. Thus, the movable member 60 and the moving member 50 are pulled against each other in the Y-direction while they overlap each other. As a result, the lower ends of the guiding pins 54 and 55, which are normally provided at the moving member 50, abut on the ends of the elongated guiding holes 63 and 64 of the movable member 60 at the Y1-side.

As shown in FIG. 2, a sliding member 80, which is formed in a rectangular shape and made of a metal plate, is provided in a region between the one guiding member 30 and the other guiding member 30 on the surface of the base chassis 20. The center of the sliding member 80 is provided with a shaft 81. A distal end of the sliding member 80 extends in the Z2-direction in the drawing from the lower face of the sliding member 80. A power transmission means 90 is rotatably provided at a distal end of the shaft 81. The power transmission means 90 is composed of a two-stage gear in which a small-diameter pinion gear 92 is provided above a large-diameter pinion gear 91 at a predetermined distance therefrom, and a sliding pin 93, which protrudes in the Z2-direction in the drawing, is provided on the lower face of the large-diameter pinion gear 91. In addition, when the number N1 of teeth of the large-diameter pinion gear 91 and the number N2 of teeth of the small-diameter pinion gear 92, the following inequality is satisfied: N1>N2.

Both edges of the sliding member 80 in its transverse direction are respectively formed with two elongated guiding holes 82 and 83 which extend in the Y-direction. Distal ends of the guiding pins 54 and 55, which are provided in the moving member 50, are respectively inserted into the elongated guiding holes 82 and 83. Specifically, the guiding pins 54 and 55 are respectively inserted through the elongated guiding holes 23a and 23b of the base chassis 20, and further their distal ends are respectively inserted into the elongated guiding holes 82 and 83 of the sliding member 80. Thus, the sliding member 80 is in a state which can move in the Y-direction in drawing by the guiding pins 54 and 55 and the elongated guiding holes 82 and 83. In addition, the sliding member 80 is movable in the Y-direction on the surface of the base chassis 20, and when it moves in the Y1-direction, it moves in a gap between the base chassis 20 and the board 39.

A protruding piece 84 is formed in the elongated guiding hole 83 so as to protrude in a substantially triangular shape in the X1-direction in the drawing from the edge of the sliding member 80 and to be bent in the Z2-direction in the drawing. The protruding piece 84 is inserted into the elongated hole 24 which is formed in the base chassis 20, and its distal end reaches the lower face of the base chassis 20. The distal end of the protruding piece 84 is formed with a hooking piece 85. A biasing member S3, such as a coil spring, is installed in its compressed state between the hooking part 85 and the hooking piece 26 which is provided at a front position of the base chassis 20. Thus, the sliding member 80 is always biased forward (in the Y2-direction) on the base chassis 20.

In a state in which the sliding member 80 is mounted on the surface of the base chassis 20, the small-diameter pinion gear 92 of the power transmission means 90 meshes with the first rack part 21a which is formed in the open hole 21 of the base chassis 20. Further, the large-diameter pinion gear 91 of the power transmission means 90 is inserted into the open hole 51 of the moving member 50 and the opening 61 of the movable member 60, and meshes with the second rack part 62 which is provided in the movable member 60. In other words, the power transmission means 90 meshes with the first rack part 21a and the second rack part 62 from both sides in the X-direction.

A sliding pin 93, which is provided in the power transmission means 90, is inserted into the first sliding groove 12a which is formed in the surface of the cam member 12, and is freely movable in the first sliding groove 12a.

Hereinafter, the operation of the recording medium mounting apparatus 10 will be described.

(Initial State)

FIG. 5 and FIG. 6 show an initial state before a hard disk is inserted, in which FIG. 5 is a plan view of the recording medium mounting apparatus, and FIG. 6 is a side view with a front part of the recording medium mounting apparatus enlarged.

As shown in FIG. 5, when the cartridge 2 of the recording medium 1 is in its initial state before it is inserted into the insertion part 10A of the recording medium mounting apparatus 10 which is surrounded by the inclined faces 31$a$, 32$a$ and 33$a$ which are formed in the pair of guiding members 30 and 30, the cam member 12 is rotated clockwise in FIG. 3. Therefore, the sliding pin 93 of the power transmission means 90 is located at the Y2-side (the side away from the shaft 11$a$) in the widened part 12$a$3 of the first sliding groove 12$a$ which is formed in the cam member 12.

At this time, the moving member 50 and the movable member 60 are moved to the front position in the Y2 direction by a biasing force of the biasing member S2 while they are substantially integrated with each other. Similarly, the sliding member 80 is also moved to the front position by the biasing force of the biasing member S3.

As shown in FIG. 6, in the initial state, with the result that the moving member 50 is moved to the front position, the arm part 72 of the pull-in member 70 is rotated counterclockwise against the biasing force of the biasing member S1. In other words, the locking piece 74 of the pull-in member 70 is supported by the supporting part 32$f$ in the supporting hole 32$e$ which climbs the inclined part 32$d$ of the guiding member 30.

Further, the actuator 17$a$1 of the first switching member 17$a$ is pressed by the pressing part 53 of the moving member 50, and the switching state of the first switching member 17$a$ is set to 'OFF'. Moreover, as shown in FIG. 5, the rocking member 15 rocks counterclockwise, and the actuator 17$b$1 of the second switching member 17$b$ is pressed by the pressing part 15$b$, and the second switching member 17$b$ is set to 'ON', and the third switching member 17$c$ is set to 'OFF'.

Moreover, as shown in FIG. 5, the rocking member 15 rocks counterclockwise, the actuator 17$b$1 of the second switching member 17$b$ is pressed by the pressing part 15$b$, the second switching member 17$b$ is set to 'ON', and the third switching member 17$c$ is set to 'OFF'. Thus, the control unit can detect that the moving member 50 is located at the insertion standby position from the rotation angle of the cam member.

(Insertion Operation)

In the initial state, the cartridge 2 of the recording medium 1 is inserted into the insertion part 10A. When the cartridge 2 is inserted into the insertion part 10A, both side faces 2B and 2B of the cartridge 2 are guided in the insertion direction (in the Y1-direction) while they are sandwiched among the bottom face 31, the side face 32 and the top face 33 of each of the guiding members 30 and 30.

Moreover, when the cartridge 2 is inserted in the insertion direction, the front face 2A of the cartridge 2 abuts on the pressed parts 52$a$ and 52$a$ which are provided in the moving member 50, and the moving member 50 is moved in the insertion direction along with the cartridge 2 against the biasing force of the biasing member S3. During the insertion of the cartridge 2, the biasing member S3 functions as a damper, so that the insertion sense of touch can be improved.

Here, when the moving member 50 is moved in the insertion direction, the lower ends of the guiding pins 54 and 55 of the moving member 50 presses the ends of the elongated guiding holes 63 and 64 of the movable member 60 at the Y1-side. Thus, the moving member 50 and the movable member 60 are moved in the insertion direction while they are integrated with each other. At this time, the power transmission means 90 having the large-diameter pinion gear 91 which meshes with the second rack part 62 of the movable member 60 is also moved in the insertion direction. However, since the sliding pin 93 of the power transmission means 90 is located in the widened part 12$a$3 of the cam member 12, it can move in the widened part 12$a$3 in the insertion direction (see FIG. 7). Thus, it is possible to prevent the damper function by the biasing member S3 from being obstructed by the power transmission means 90.

As shown in FIG. 7, when the moving member 50 is moved in the insertion direction, the pull-in member 70 is also moved in the insertion direction along with the moving member 50. Then, when the locking part 74 of the pull-in member 70 moves from the supporting part 32$f$ of the guiding member 30 and reaches the inclined part 32$d$, the pull-in member 70 is biased clockwise in the drawing by the biasing member S1. Thus, the locking part 74 can climb down the inclined part 32$d$. However, in the initial state of insertion, the locking part 74 is supported by the stepped part 2$c$ which is provided on the side face 2B of the cartridge 2. Thus, the rotation of the pull-in member 70 is limited, and the locking part 74 is regulated so that it cannot reach the elongated guiding hole 32$c$. Then, when the cartridge 2 is further inserted and the concave part 2$d$ provided in the side face 2B reaches the position where it overlaps the inclined part 32$d$ of the guiding member 30, the rotation of the pull-in member 70 is allowed. Thus, the locking part 74 climbs down the stepped part 2$c$ to reach the elongated guide hole 32$c$, and locks the concave part 2$d$.

As described above, in the present invention, the locking part 74 ascends in the direction of height (in the Y-direction), so that it can hook the concave part 2$d$ of the cartridge 2. Thus, it is possible to reduce the width of the entire recording medium mounting apparatus 10 compared to a case in which the cartridge 2 is hooked from the transverse direction. As a result, it is possible to decrease, particularly, the width of the recording medium mounting apparatus 10.

Further, at this time, since the pressing part 53 provided in the moving member 50 falls off from the actuator 17$a$1 of the first switching member 17$a$, the switching state of the first switching member 17$a$ is switched from the 'OFF' state to the 'ON' state. As a result, the control unit at the equipment body can detect that the cartridge 2 has been inserted into the insertion part 10A of the recording medium mounting apparatus 10.

Further, in case the cartridge 2 is erroneously inserted into the insertion part 10A in an abnormal state, for example, in case a rear face 2D of the cartridge 2 is inserted toward the insertion part 10A, or in case the cartridge 2 is inserted with its upside down, the locking parts 74 and 74 of the pull-in member 70 cannot lock the concave parts 2$d$ and 2$d$ of the cartridge 2. Therefore, the rotation of the pull-in member 70 is not allowed, but the pull-in member 70 is maintained in a state as shown in FIG. 6.

Moreover, if the cartridge 2 with its abnormal orientation is pushed in the insertion direction, as shown in FIG. 6, the pull-in member 70 is slightly moved in the insertion direction. However, the locking part 74 abuts on the regulating part 32$g$ of the supporting hole 32$e$, which can prevent the pull-in member 70 from being further moved in the insertion direction. As a result, the pressing part 53 maintains a state of pressing the actuator 17$a$1 of the first switching member 17$a$, which can prevent the switching state of the first switching member 17$a$ from being switched. Thus, the cartridge 2 with its abnormal orientation can be prevented from being automatically carried in the insertion direction by a loading operating which will be described later. In other words, the cartridge 2 with its abnormal orientation can be prevented in advance from being carried into the inside of the apparatus.

(Loading Operation of Cartridge)

When the control unit detects that the cartridge 2 is inserted in its normal state to switch the first switching member 17a to its 'ON' state, it starts the driving motor M to rotate the cam member 12 counterclockwise.

When the cam member 12 is rotated counterclockwise, the sliding pin 93 provided in the power transmission means 90 is moved in the insertion direction along the first sliding groove 12a. At this time, since the small-diameter pinion gear 92 rotates clockwise while it meshes with the first rack part 21a, the power transmission means 90 is moved in the insertion direction. Then, the sliding member 80 having the power transmission means 90 mounted thereon is moved in the insertion direction while it resists against the biasing member S3.

Simultaneously, since the second rack part 62 meshing with the large-diameter pinion gear 91 is fed in the insertion direction by the clockwise rotation of the power transmission means 90, the movable member 60 having the second rack part 62 is moved in the insertion direction. When the movable member 60 is moved in the insertion direction, the moving member 50 is tensioned in the insertion direction via the biasing member S2. Thus, the moving member 50 is also moved in the insertion direction along with the movable member 60. Then, when the moving member 50 is moved in the insertion direction, the cartridge 2, which is locked by the locking part 74 of the pull-in member 70 mounted on the moving member 50, is automatically carried into the inside of the recording medium mounting apparatus 10. In other words, the cam member 12, the power transmission means 90, the moving member 50, and the pull-in member 70 constitutes a loading mechanism which carries the cartridge 2 in the insertion direction.

The cartridge 2 is moved in the insertion direction in a state in which its both side faces 2B and 2B are held by the three faces including the bottom face 31, the side faces 32 and the top face 33 of the guiding members 30 and 30. In this case, when the cartridge 2 reaches the inside of the guiding members 30 and 30, the guiding projections 32h and 32h provided on the inner walls of the guiding members 30 and 30 are respectively inserted into the guiding grooves 2b and 2b which are formed in both the side faces 2B and 2B. Therefore, the cartridge 2 can be inserted in the insertion direction in a more stable posture.

Further, as shown in FIG. 8, when the cartridge 2 is has been loaded, the control pin 15a of the rocking member 15 is located at any position other than the outer peripheral end 12b1 and the inner peripheral end 12b2 within the second guiding groove 12b of the cam member 12, and the rocking member 15 is set to the neutral position. Thus, since neither the second switching member 17b nor the third switching member 17c are operated, the control unit can determine that the cam member 12 is in its loaded state.

(Connecting Operation of Connector)

As shown in FIG. 8, when the sliding pin 93 goes past the connecting part 12a4 of the first sliding groove 12a, the sliding pin 93 is moved in the insertion direction by the small arcuate groove 12a2. As shown in FIG. 9, when the sliding pin 93 reaches the innermost peripheral part 12a5 of the first sliding groove 12a, the connecting part 42 of the internal connector 40 is inserted into the opening 2a which is provided at the front face 2A of the cartridge 2 which is locked by the pull-in member 70 with the movement of the sliding pin 93.

When the insertion connector 3 of the cartridge 2 and the opening 43 of the internal connector 40 are mounted on each other, an insertion load is produced due to a frictional resistance therebetween. For this reason, even though the movable member 60 meshing with the large-diameter pinion gear 91 of the power transmission means 90 moves in the insertion direction, the moving member 50 having the pull-in member 70 which locks the cartridge 2 cannot move along with the movable member 60, and the insertion connector 3 is maintained in a state in which it abuts on the internal connector 40. At this time, since the biasing member S2 installed between the moving member 50 and the movable member 60 is extended with the movement of the movable member 60, the biasing force of the biasing member S2 gradually increases. Then, if the biasing force of the biasing member S2 exceeds an insertion load between the insertion connector 3 and the internal connector 40, the insertion connector 3 is inserted into the opening 43 of the internal connector 40.

When the insertion connector 3 at the cartridge 2 is mounted into the opening 43 of the internal connector 40, electrical connections are established between the respective conducting parts 3a provided in the insertion connector 3 and the respective connecting terminals provided in the opening 43 of the internal connector 40. As a result, it is possible to reproduce or record digital data between the recording medium 1 and the equipment body having the recording medium mounting apparatus 10.

As shown in FIG. 9, when the mounting between the insertion connector 3 and the internal connector 40 is completed, the control pin 15a of the rocking member 15 goes into the inner peripheral end 12b2 of the second sliding groove 12b of the cam member 12. Thus, the rocking member 15 is rocked clockwise in FIG. 9. At this time, since the pressing part 15b of the rocking member 15 presses the actuator 17b1 of the second switching member 17b, the control unit can detect that the cam member 12 has been reached a state in which the mounting of the connector is completed.

At the beginning of the loading operation, the sliding pin 93 of the power transmission means 90 is moved in the insertion direction by the large-diameter arcuate groove 12a1 of the first sliding groove 12a. However, as shown in FIG. 8, if the sliding pin 93 goes past the connecting part 12a4 of the first sliding groove 12a, it is now moved in the insertion direction by the small arcuate groove 12a2.

Here, since the large-diameter arcuate groove 12a1 is formed to have a larger curvature than the small-diameter arcuate groove 12a2, the sliding pin 93 is moved by a traveling distance L1 from a position a1 of the widened part 12a3 as shown in FIG. 3 to a position a2 of the connecting part 12a4 as shown in FIG. 8 while the cam member 12 makes about half round. At this time, as shown in FIG. 8, the traveling distance of the locking part 74 of the pull-in member 70, i.e., the traveling distance of the cartridge 2 in the insertion direction is L0.

The relationship between the traveling distance L0 of the cartridge 2 and the traveling distance L1 of the sliding pin 93 is $L0 \leqq 2 L1$. Specifically, when the large-diameter arcuate groove 12a1 is used in the recording medium mounting apparatus 10, it is possible to move the cartridge 2 by the traveling distance L1 with about less than half of the traveling distance L1 of the sliding pin 93 (that is, the sliding member 80 having the power transmission means 90 mounted thereon).

On the other hand, in the course of from FIG. 8 to FIG. 9, that is, until the sliding pin 93 reaches the position a3 of the innermost peripheral part 12a5 from the position a2 of the connecting part 12a4, the sliding pin 93 is moved by the small-diameter arcuate groove 12a2. Since the small-diameter arcuate groove 12a2 has a small radius of curvature, the sliding pin 93 is moved by the traveling distance L2 from the position a2 to the position a3 while the cam member 12 makes about half round. At this time, as shown in FIG. 9, the traveling distance of the locking part 74 of the pull-in member 70, that is, the traveling distance of the cartridge 2 in the insertion direction is L3. In other words, when the small-diameter arcuate groove 12a2 is used in the recording medium mounting apparatus 10, the traveling distance L2 of the sliding pin 93 (that is, the sliding member 80 having the power transmission means 90 mounted thereon) and the traveling distance L3 of the cartridge 2 are almost the same (L2≅L3)

Further, as described above, the number N1 of teeth of the large-diameter pinion gear 91 and the number N2 of teeth of the small-diameter pinion gear 92 satisfies the following relationship: N1>N2. Thus, if the small-diameter pinion gear 92 rotates the first rack part 21a by, for example, the teeth number n, it is possible to move the second rack part 62 meshing with the large-diameter pinion gear 91 by the teeth number (N1>N2) n(>n). In other words, it is possible to makes the traveling distances, in the Y-direction, of the movable member 60 having the second rack part 62 and the moving member 50 connected to the movable member 60 via the biasing member S2, larger than the traveling distance, in the Y-direction, of the power transmission means 90, that is, the sliding member 80 having the power transmission means 90 mounted thereon.

In other words, in the recording medium mounting apparatus 10 of the present invention, it is possible to move the cartridge 2 by the traveling distance which is above twice as long as the traveling distance of the sliding member 80. Thus, since the traveling distance of the sliding member 80 in the Y-direction can be reduced, the recording medium mounting apparatus 10 can be miniaturized.

Further, if the rotational speed of the cam member 12 is made constant, the cartridge 2 is moved by the traveling distance L0 while the cam member 12 makes half round for the first time (while the sliding pin 93 moves in the large-diameter arcuate groove 12a1), and the cartridge 2 is moved by the traveling distance L3 while the cam member 12 makes another half round (while the sliding pin 93 moves in the small-diameter arcuate groove 12a2). In other words, most of the movement of the cartridge 2 is made in the large-diameter arcuate groove 12a1, and this large-diameter arcuate groove 12a1 functions as a moving unit which moves the cartridge 2 in the insertion direction.

Further, since the relationship between the traveling distance L0 and the traveling distance L3 is L0>L3, the speed of the cartridge 2 carried at the large-diameter arcuate groove 12a1 can be made higher than that carried at the small-diameter arcuate groove 12a2. Thus, if the cartridge 2 is inserted into the insertion part 10A, the cartridge 2 can be swiftly pulled into the recording medium mounting apparatus 10. Therefore, even in the recording medium 1 whose outline dimension is long in the Y-direction as in the large-sized (2.5-inch-type) hard disk, the time required for pulling the recording medium 1 into the recording medium mounting apparatus 10 can be shortened.

Further, when the insertion connector 3 of the cartridge 2 is mounted on the internal connector 40 at the recording medium mounting apparatus 10, the sliding pin 93 reaches the small-diameter arcuate groove 12a2 which is provided at the inner peripheral side of the cam member 12. Thus, the sliding pin 93 is driven with a larger torque than the large-diameter arcuate groove 12a1 at the outer peripheral side. As a result, since a large pull-in force is generated in the pull-in member 70, it is possible to fit and connect the insertion connector 3 to the internal connector 40 with stronger force. In other words, the small-diameter arcuate groove 12a2 of the cam member 12 functions as a connecting part which mounts the insertion connector 3 to the internal connector 40 with stronger force.

Moreover, when the sliding pin 93 moves in the small-diameter arcuate groove 12a2, the above-mentioned biasing force of the biasing member S2 causes an insertion load between the insertion connector 3 and the internal connector 40 so that the insertion connector 3 is inserted into the opening 43 of the internal connector 40.

Thus, in the recording medium mounting apparatus 10 of the present invention, the tension of the biasing member S2 is supplementarily applied in addition to a large pull-in force caused by the pull-in member 70. Further, the insertion connector 3 can be completely fitted to the internal connector 40 with larger mounting force. Therefore, it is possible to reliably perform the mounting between the insertion connector 3 and the internal connector 40.

Moreover, since the large-diameter arcuate grove 12a1 which moves the cartridge 2 and the small-diameter arcuate groove 12a2 which connects connectors with each other is formed by a continuous first sliding groove 12a, the moving operation which moves the cartridge 2 can be swiftly shifted to the connecting operation which connects the connectors with each other.

In addition, when the operation of the cartridge 2 being mounted into the recording medium mounting apparatus 10 is completed, it is possible to pull the entire cartridge 2 into the recording medium mounting apparatus 10 fully, irrespective of a small-sized recording medium 1 or a large-sized recording medium 1. As a result, an external force is not applied to a part of the cartridge 2 during operation, and data errors and data destruction also are not caused.

Although the above embodiment has been described using a removable hard disk as an embodiment of a recording medium having a connector, the present invention is not limited thereto, and other recording medium, for example, a recording medium in which an IC memory instead of a magnetic disk is built in the cartridge 2 may be employed.

Further, although the above embodiment has been described about the construction in which the movable member 60 and the moving member 50 are separated provided, the present invention is not limited thereto, and a construction may be employed in which the second rack part 62 is integrally formed with the edge of the opening 51 of the moving member 50. However, it is advantageous that the movable member and the moving member are separately provided as described above, in that the insertion connector 3 can be completely fitted to the internal connector 40 by using the tension of the biasing member S2.

Moreover, although the above embodiment has been described with reference to an example in which a two-stage gear composed of two types of pinion gears whose teeth numbers are different from each other is employed as the power transmission means 90, the present invention is not limited thereto, and a construction can be employed in which the first rack part 21a and the second rack part 62 mesh with the power transmission means 90 composed of one pinion gear. However, it is advantageous that the two-stage gear is employed as the power transmission means in that the traveling distances of the moving member 50 and the movable member 60 is made larger than the traveling distance of the sliding member 80 having the power transmission means 90 mounted thereon, using the gear ratio.

What is claimed is:

1. A recording medium mounting apparatus which a recording medium provided with an external connecting part is mounted on or demounted from, the apparatus comprising:

an insertion part having the recording medium inserted thereinto;
   a connector connected to the external connecting part; and
   a loading mechanism which carries the recording medium in an insertion direction from the insertion part to a mounting completion position where the external connecting part is connected to the connector,
   the loading mechanism including:
   a pull-in member which locks the recording medium and pulls in the recording medium in the insertion direction;
   a moving member which moves the pull-in member; and
   a driving motor which drives the moving member.

2. The recording medium mounting apparatus according to claim 1,
   wherein the pull-in member has a locking part which locks a concave part formed in a side face of the recording medium, the locking part is supported to be vertically rockable with respect to the moving member, and the rocking part goes into the concave part from the top to lock the recording medium.

3. The recording medium mounting apparatus according to claim 1,
   wherein the moving member is formed with a pressed part which is pressed by the recording medium, and a transverse side part of the moving member orthogonal to the insertion direction is provided with a guiding member having an elongated guiding hole which guides the movement of the locking part of the pull-in member, a supporting hole which set the locking part to a unlocking state away from the concave part, and an inclined part which guides the locking part into the elongated guiding hole from the supporting hole to lead the locking part to a locking state in which the concave part is locked, and
   wherein, when the recording medium inserted into the insertion part presses the pressed part to move the moving member in the insertion direction, the locking part climbs down the inclined part from the supporting hole to lock the concave part of the recording medium.

4. The recording medium mounting apparatus according to claim 3,
   wherein an edge of the supporting hole at the insertion side is formed with a regulating part which prevents the movement of the pull-in member in the insertion direction, when the locking part climbs down the inclined part.

5. A recording medium mounting apparatus which a recording medium provided with an external connecting part is mounted on or demounted from, the apparatus comprising:

an insertion part having the recording medium inserted thereinto;
   a connector connected to the external connecting part; and
   a loading mechanism which carries the recording medium in an insertion direction from the insertion part to a mounting completion position where the external connecting part is connected to the connector,
   the loading mechanism including:
   a cam member having a first sliding groove and rotatably supported;
   a driving motor which rotates the cam member;
   a moving gear having a sliding pin which moves along the first sliding groove of the cam member;
   a moving member which is moved according to the movement of the moving gear;
   a pull-in member which is mounted on the moving member to lock the recording medium; and
   a power conversion means which converts a moving force of the moving gear into a moving force of the moving member.

6. The recording medium mounting apparatus according to claim 5,
   wherein the power conversion means has a sliding member which moves while rotatably supporting the moving gear, a base member provided with a first rack part which meshes with the moving gear and causes rotation according to the movement of the sliding member, and a second rack part which is provided integrally with or separately from the moving member and which meshes with the moving gear to apply a moving force in the insertion direction to the moving member.

7. The recording medium mounting apparatus according to claim 5,
   wherein the moving member is formed with a pressed part which abuts on the recording medium, and a second biasing member which biases the sliding member in a direction opposite to the insertion direction is provided between the sliding member and the base member, and
   wherein the first sliding groove is formed with a widened part which allows movement of the sliding pin mounted on the sliding member, when the recording medium inserted into the insertion part presses the pressed part to slightly move the moving member in the insertion direction against the second biasing member.

8. The recording medium mounting apparatus according to claim 5, further comprising:
   a first switching member which detects whether or not the recording medium is locked by the pull-in member;
   a second switching member which detects from a rotation angle of the cam member whether or not the sliding member is moved to an insertion standby position which is the insertion part side; and
   a third switching member which detects from the rotation angle of the cam member whether or not the recording medium inserted into the insertion part is moved to the mounting completion position where the external connecting part is fitted to the connector.

9. The recording medium mounting apparatus according to claim 6,
   wherein the power transmission means is provided with a movable member having the second rack part, and the moving member and the movable member are connected to each other via a first biasing member.

10. The recording medium mounting apparatus according to claim 6,
    wherein the moving gear is a two-stage gear which is integrally formed coaxially with the a small-diameter gear and a large-diameter gear, the small-diameter gear meshes with the first rack part, and the large-diameter gear meshes with the second rack part.

11. The recording medium mounting apparatus according to claim 8,
    wherein the cam member is formed with a second sliding groove, and is provided with a rocking member which has a control pin which slides along the second sliding groove, and which switches switching states of the second switching member and the third switching member according to the rotation angle of the cam member.

12. The recording medium mounting apparatus according to claim 9,
wherein, when the recording medium is moved in the insertion direction, the external connecting part is fitted to the connector in an imperfect state, to limit the movement of the moving member by an insertion load caused therebetween, then only the movable member is moved to the mounting completion position to cause a tension in the first biasing member, and when the tension exceeds the insertion load, the external connecting part is completely fitted to the connector.

13. A recording medium mounting apparatus which a recording medium provided with an external connecting part is mounted on or demounted from, the apparatus comprising:
an insertion part having the recording medium inserted thereinto;
a connector connected to the external connecting part; and
a loading mechanism which carries the recording medium in an insertion direction from the insertion part to a mounting completion position where the external connecting part is connected to the connector,
the loading mechanism including:
a moving unit which moves the recording medium in the insertion direction; and
a connecting part which connects the external connecting part to the connector, the connecting part being formed so as to apply a force larger than that applied to the moving unit to the recording medium.

14. The recording medium mounting apparatus according to claim 13,
wherein the loading mechanism has a cam member which is rotated by a driving motor, and the cam member is a cam groove in which a first cam groove functioning as the moving unit, and a second cam groove functioning as the connecting part are continuously provided.

15. The recording medium mounting apparatus according to claim 13,
wherein the first cam groove is formed in a shape of a large arcuate groove which is provided at the outer peripheral side of the cam member and has a large radius of curvature, and the second cam groove is formed in a shape of a small arcuate groove which is provided more toward the inner peripheral side than the first cam groove and has a small radius of curvature.

16. The recording medium mounting apparatus according to claim 14,
wherein the loading mechanism is provided with a moving member which has a pressed part abutting on the recording medium and a pull-in member locking the recording medium, and which moves in the insertion direction, a sliding pin which slides in the first cam groove and the second cam groove, a sliding member which has the sliding pin mounted thereon and moves along with the sliding pin, a base member on which the sliding member slides, and a biasing member which is provided between the sliding member and the base member to bias the sliding member in a direction opposite to the insertion direction, and
wherein the first cam groove is formed with a widened part which allows movement of the sliding pin, when the recording medium inserted into the insertion part presses the pressed part to slightly move the moving member in the insertion direction against the second biasing member.

17. The recording medium mounting apparatus according to claim 16, further comprising:
a first switching member which detects whether or not the recording medium is locked by the pull-in member;
a second switching member which detects from a rotation angle of the cam member whether or not the sliding member is moved to an insertion standby position which is the insertion part side; and
a third switching member which detects from the rotation angle of the cam member whether or not the recording medium inserted into the insertion part is moved to the mounting completion position where the external connecting part is fitted to the connector.

* * * * *